United States Patent [19]

Folk et al.

[11] Patent Number: 4,777,716

[45] Date of Patent: Oct. 18, 1988

[54] METHOD FOR LOW PRESSURE TESTING OF A SOLID STATE PRESSURE SENSOR

[75] Inventors: Lee E. Folk, Phoenix; William B. Newton, Scottsdale; Robert P. Rossman, Mesa, all of Ariz.

[73] Assignee: Motorola Inc., Schaumburg, Ill.

[21] Appl. No.: 110,157

[22] Filed: Oct. 13, 1987

Related U.S. Application Data

[62] Division of Ser. No. 899,848, Aug. 25, 1986, Pat. No. 4,733,553.

[51] Int. Cl.⁴ ...................... H01C 17/00; H01L 41/22
[52] U.S. Cl. ..................................... 29/593; 29/25.35; 29/621.1; 324/158 F
[58] Field of Search ............. 29/593, 610 R, 610 SG, 29/25.35; 73/4 R, 4 V; 338/4, 42; 324/158 F

[56] References Cited

U.S. PATENT DOCUMENTS

| | | | |
|---|---|---|---|
| 3,766,616 | 10/1973 | Standte | 29/593 X |
| 3,913,195 | 10/1975 | Beaver | 29/25.35 |
| 3,979,671 | 9/1976 | Meeker et al. | 324/158 F |
| 4,281,449 | 8/1981 | Ports et al. | 29/593 |
| 4,567,432 | 1/1986 | Buol et al. | 324/158 F |

Primary Examiner—Carl E. Hall
Attorney, Agent, or Firm—Raymond J. Warren; Joe E. Barbee

[57] ABSTRACT

A miniature vacuum chamber that is capable of testing individual dice prior to packaging is described. The upper portion of the chamber consists of a housing having testing probes and a vacuum inlet disposed therein. The lower portion of the chamber consists of a chuck that holds a wafer and a lower vacuum chamber. The lower portion is indexed to place a dice in contact with the probes. The upper and lower portions then form a seal and a vacuum is drawn in the area defined by the upper and lower chambers. The dice is then tested; the area pressurized; and the chuck indexed to test the next dice.

5 Claims, 4 Drawing Sheets

4,777,716

METHOD FOR LOW PRESSURE TESTING OF A SOLID STATE PRESSURE SENSOR

This is a division of application Ser. No. 899,848, filed Aug. 25, 1986, now U.S. Pat. No. 4,733,553, issued Mar. 29, 1988.

BACKGROUND OF THE INVENTION

This invention relates, in general, to testing of solid state pressure sensors and, more particularly, to low pressure testing of solid state pressure sensors.

Presently, solid state pressure sensors are tested after final assembly of the devices. This means that the manufacturer has already borne most of the cost of production before a device can be evaluated as to its usefulness.

To test the devices, they are placed in a vacuum chamber after they are packaged; covered; subjected to a vacuum; and tested. This method takes time to evacuate the atmosphere from a large area before testing and replacing the atmosphere after testing.

SUMMARY OF THE INVENTION

Accordingly, it is an object of the present invention to provide a method and apparatus for low pressure testing of a solid state pressure sensor that overcomes the above deficiencies.

Another object of the present invention is to provide a method and apparatus for low pressure testing of a solid state pressure sensor that allows testing of the sensor prior to packaging.

Still another object of the present invention is to provide a method and apparatus for low pressure testing of a solid state pressure sensor that can test a dice prior to packaging (e.g. while the dice is still part of the wafer).

Yet another object of the present invention is to provide a method for low pressure testing of a solid state pressure sensor that can be calibrated while under test.

The above and other objects and advantages of the present invention are provided by the method and apparatus for low pressure testing of a solid state pressure sensor described herein.

A particular embodiment of the present invention is a low pressure testing apparatus for testing a solid state pressure sensor having: an upper portion consisting of a housing having testing probes and a vacuum inlet disposed therein; and a lower portion consisting of a chuck that holds a wafer. The lower portion is indexed to place a dice in contact with the probes. The upper and lower portions then form a seal and a vacuum is drawn in the area defined by the upper and lower portions. The dice is then tested; the area pressurized; and the chuck indexed to test the next dice.

DETAILED DESCRIPTION OF THE DRAWINGS

Figure 1:
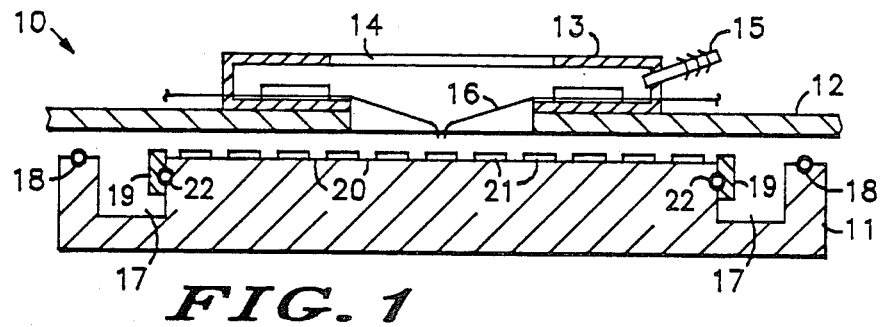
FIGS. 1 and 2 are cross-sectional views of a low pressure test apparatus embodying the present invention.
Figure 2:
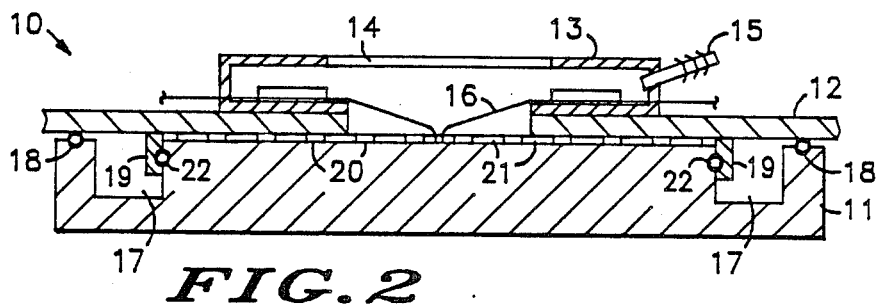

Referring to FIGS. 1 and 2, a cross-sectional view of a low pressure test apparatus, generally designated 10, is illustrated. Apparatus 10 consists of a wafer mounting chuck 11; a center plate 12; and a vacuum housing 13.

Figure 3:
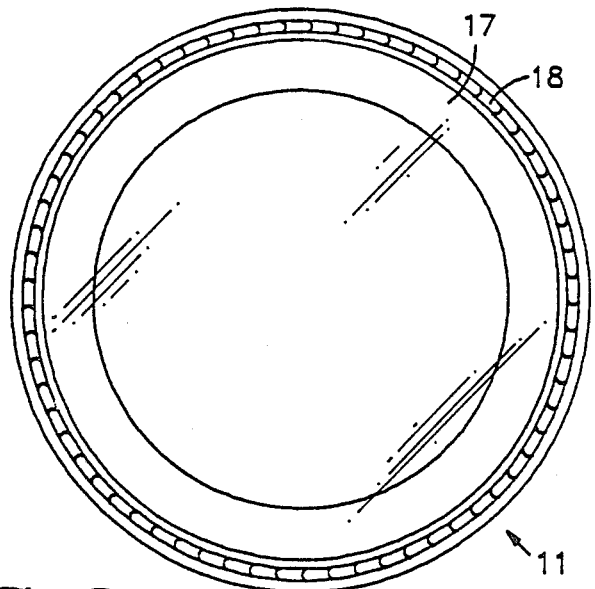
FIG. 3 is a top view of the wafer chuck shown in FIGS. 1 and 2.
Figure 4:
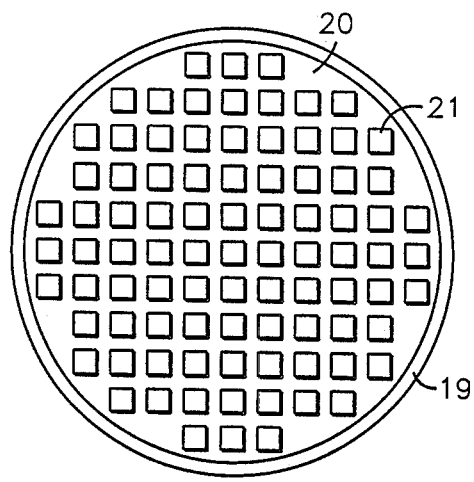
FIG. 4 is a top view of a wafer that has been cut into individual dice.

As shown in FIGS. 1 and 2, vacuum housing 13 consists of a lens area 14, a vacuum connector 15 and probe contacts 16 all mounted to center plate 12. Chuck 11 is shown in more detail in FIG. 3. Chuck 11 is a circularly shaped disk having a first groove 17 and a second groove containing an O-ring 18. Groove 17 of chuck 11 is designed to receive a collar 19 which holds an adhesive film 20. Die 21 are disposed on film 20 as shown in FIG. 4.

As can be seen in FIG. 1, collar 19 is disposed in groove 17 and is retained in place by an O-ring 22. Die 21 then rest on chuck 11 with adhesive film 20 disposed therebetween.

In operation, one particular embodiment of the present invention has center plate 12 and vacuum housing 13 mounted together in a stationary relation. Chuck 11 is moved to place a particular dice 20 in contact with probe contacts 16. Chuck 11 is then moved into contact with center plate 12 with O-ring 18 making a seal about the contact area.

The atmosphere is then removed from apparatus 10 through vacuum connector 15. The pressure will be reduced to a test level, such as 100 Torr. Tests will then be taken of the voltage across the various contact points coupled to connector probes 16. If the output of dice 21 is not within an acceptable range, it is adjusted by trimming one of several resistors located on dice 21. This is typically accomplished by a laser being directed through lens area 14. The actual process of laser trimming resistors is well known in the art and will not be discussed in detail herein.

Figure 5:
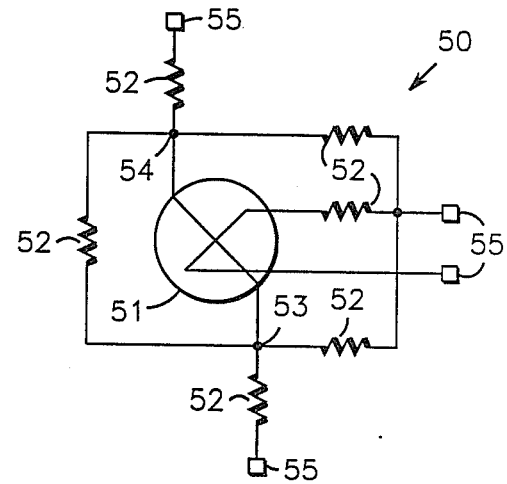
FIG. 5 is a schematic diagram of a prior art circuit embodied on the solid state pressure sensor of FIGS. 1 and 2.

FIG. 5 illustrates a basic schematic diagram 50 of a pressure sensor. A pressure sensor 51 is shown having various leads coupled to bonding pads 55. Between the leads of sensor 51 and pads 55 are a plurality of resistors 52. By trimming resistors 52, the voltage across pads 55 can be increased or decreased. Occasionally, a pressure sensor 50 is found that is unable to be calibrated because the amount of error is too large for accurate adjustment. These sensors are marked and, later, discarded.

Figure 6:
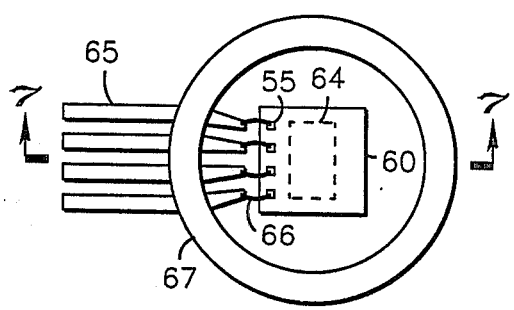
FIGS. 6 and 7 are prior art views of solid state pressure sensors in a package.
Figure 7:
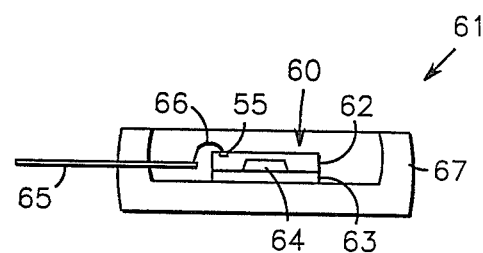

Prior to the development of the above described invention, a dice, such as dice 60 shown in FIGS. 6 and 7, is mounted in a package 61. As shown in FIG. 7, dice 60 consists of a diaphragm dice 62 and a base dice 63. When die 62 and 63 are coupled together, a cavity 64 is defined. Various electrical components, such as resistors 52 are defined on the surface of diaphragm dice 62. These are coupled along electrical lines to bonding pads 55. Bonding pads 55 are coupled to leads 65 by bonding wires 66. Leads 65 pass through a housing 67 and are used to test dice 60.

To test this device, package 61 was covered and a vacuum drawn subjecting dice 60 to a low pressure, such as 100 Torr. The voltage across leads 55 was then measured to determine if the pressure sensor, dice 60, was calibrated accurately. If the voltage was high or low, resistors 52, incorporated in pressure sensor 60, were trimmed until the voltage was within range for that pressure.

Once the tests had been completed, the package was pressurized to normal and removed. This took a great deal of time to cycle through one testing run and required a large testing chamber that would incorporate the testing equipment.

Figure 8:
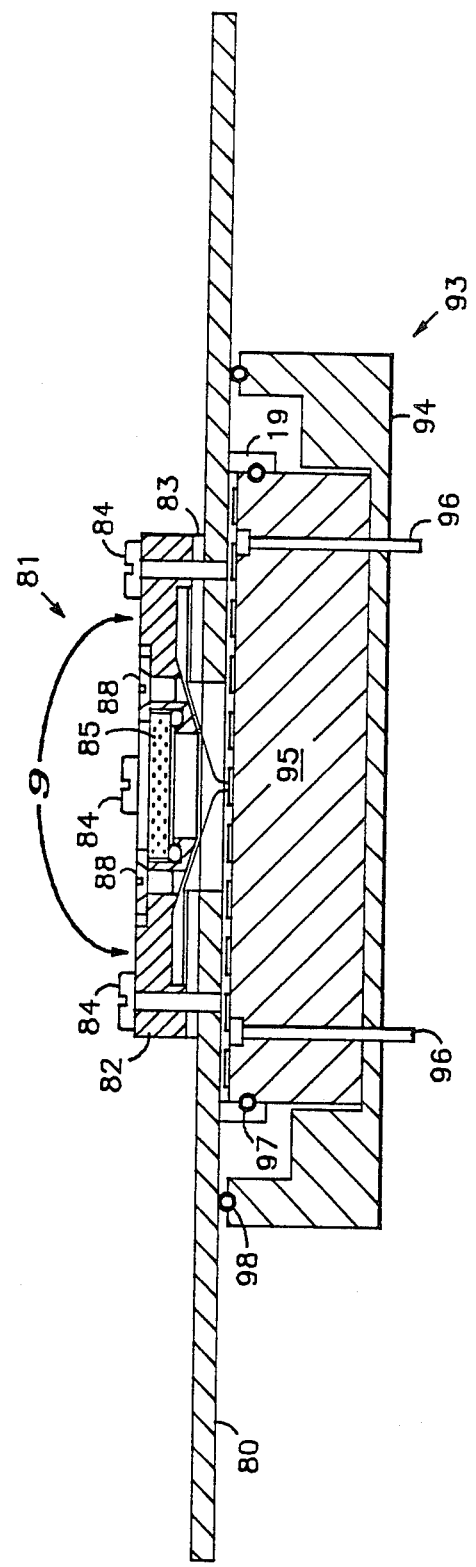
FIGS. 8 and 9 are cross-sectional views of a second embodiment of a low pressure testing apparatus embodying the present invention.
Figure 9:
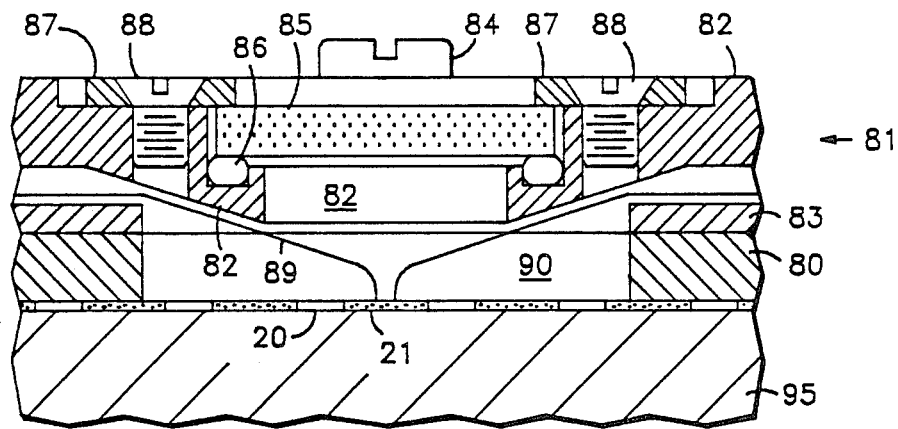

A more detailed embodiment of the present invention is illustrated in FIG. 8. A center plate 80 is shown being coupled to vacuum housing 81. Vacuum housing 81 consists of a gasket 83 placed between a formed portion 82 and center plate 80. These can be seen in more detail in FIG. 9.

Figure 10:
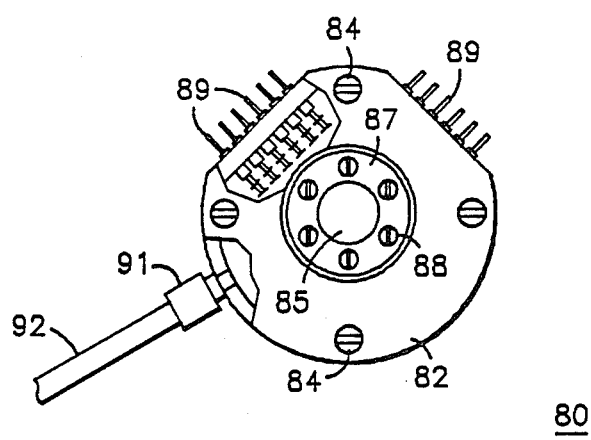
FIG. 10 is a top view, with portions broken away, of the low pressure testing apparatus of FIGS. 8 and 9.

Vacuum housing 81 is secured to center plate 80 using bolts 84 as shown in FIG. 10. A lens 85 is disposed in an opening of formed portion 82. Disposed between formed portion 82 and lens 85 is an O-ring 86. O-ring 86 serves to form a seal that will prevent leakage when a vacuum is drawn in vacuum housing 81. To secure lens 85 in place and to compress O-ring 86, a clamp 87 is bolted to formed portion 82 by bolts 88.

Testing probes 89 are shown being passed through formed portion 82, into the cavity formed by formed portion 82; and through an opening 90 in center plate 80. Probes 89 are shown in more detail in FIG. 10 where a broken away portion illustrates how probes 89 are disposed in the wall of formed portion 82. Also shown in FIG. 10 is a vacuum connector 91 being coupled to a vacuum hose 92.

A lower vacuum chamber 93 is shown in FIG. 8 disposed on the opposite surface of center plate 80 from vacuum housing 81. Chamber 93 consists of a formed portion 94 having an O-ring 98 disposed about the circumference for forming a seal between chamber 93 and center plate 80. Disposed within formed portion 94 is a wafer vacuum chuck 95. Wafer vacuum chuck 95 is coupled to chamber 93 using screws 96.

Disposed above chuck 95 are die 21 which are attached to adhesive film 20. This is shown in more detail in FIG. 4. Collar 19 is disposed about chuck 95 and is held in place by an O-ring 97.

When in place and ready for testing, chamber 93 and chuck 95 are indexed to position one of die 21 below the probe area. Chamber 93 and O-ring 98 are then placed in contact with center plate 80 and dice 21 contact probes 89. A vacuum is then drawn in the apparatus until the desired pressure level is reached. This vacuum takes approximately 1 second to achieve. Dice 21 is then tested by applying various voltages through a portion of probes 89 and reading voltage differences across other probes 89. If the output level of dice 21 is not within acceptable range, dice 21 is adjusted. The adjustment is performed by laser trimming resistors formed on dice 21. The laser beam is passed through lens 85 and onto dice 21.

Once the particular dice 21 is calibrated, the pressure is returned to normal and chamber 93 and chuck 95 are indexed to the next dice 21 to be tested. This provides a method and apparatus for low pressure testing of solid state pressure sensors that allows the sensor to be tested prior to packaging; does not require a large pressure chamber; and allows calibration of the sensor while under test.

This apparatus also allows access to testing points that are not available once the sensor is placed within a package. In addition, because of the reduced space required for this device to operate and the reduced cost of the apparatus, it is more economical to operate than the conventional methods.

Thus, it is apparent to one skilled in the art that there has been provided in accordance with the invention, a device and method that fully satisfies the objects, aims and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications and variations in the appended claims.

We claim:

1. A method of fabricating and testing a solid state pressure sensor comprising the steps of:
   (a) fabricating a diaphragm wafer;
   (b) fabricating a base wafer;
   (c) coupling said base wafer to said diaphragm wafer to form a pressure sensor wafer;
   (d) placing said pressure sensor wafer on a chuck;
   (e) moving said chuck such that a die of said pressure sensor wafer will contact a probe;
   (f) following step e, creating a vacuum about said pressure sensor wafer;
   (g) testing said die while under the vacuum created in step f;
   (h) adjusting the electrical output of said die while under the vacuum created in step f if said electrical output is not within a predetermined range;
   (i) pressuring the area about said pressure sensor wafer; and
   (j) moving said chuck into a position to test a subsequent die;
   (k) repeating steps f thru j for each of said die on said wafer that are to be tested; and
   (l) placing said die in a package.

2. A method of fabricating and testing a solid state pressure sensor comprising the steps of:
   (a) fabricating a diaphragm wafer;
   (b) fabricating a base wafer;
   (c) coupling said base wafer to said diaphragm wafer to form a pressure sensor wafer;
   (d) placing said pressure sensor wafer on a chuck;
   (e) moving said chuck such that a die of said pressure sensor wafer will contact a probe;
   (f) forming a vacuum seal by raising said chuck to contact said probe;
   (g) following step f, creating a vacuum about said pressure sensor wafer;
   (h) testing said die while under the vacuum created in step g;
   (i) adjusting the electrical output of said die while under the vacuum created in step g if said electrical output is not within a predetermined range;
   (j) removing the vacuum created about said pressure sensor wafer in step g;
   (k) lowering said chuck releasing said vacuum seal between said chuck and said probe; and
   (l) moving said chuck into a position to test a subsequent die;
   (m) repeating steps f thru l for each of said die on said wafer that are to be tested; and
   (n) placing said die in a package.

3. The method of claim 2 wherein said step f consists of having a sealing means disposed between said chuck and said probe.

4. A method of fabricating and testing a solid state pressure sensor comprising the steps, in the order stated, of:
   (a) fabricating a diaphragm wafer;
   (b) fabricating a base wafer;
   (c) coupling said base wafer to said diaphragm wafer to form a pressure sensor wafer;
   (d) placing said pressure sensor wafer on a chuck;
   (e) moving said chuck such that a die of said pressure sensor wafer will contact a probe;
   (f) forming a vacuum seal by raising said chuck to contact said probe;
   (g) creating a vacuum of a known pressure about said pressure sensor wafer;
   (h) testing said die;
   (i) adjusting the electrical output of said die to indicate said known pressure if said electrical output is not within a predetermined range of said known pressure;
   (j) pressuring the area about said pressure sensor wafer;
   (k) lowering said chuck releasing said vacuum seal between said chuck and said probe; and
   (l) moving said chuck into a position to test a subsequent die;
   (m) repeating steps f thru l for each of said die on said wafer that are to be tested; and
   (n) placing said die in a package.

5. The method of claim 4 wherein said step f consists of having a sealing means disposed between said chuck and said probe

* * * * *